M. F. WILLIAMS.
BEARING LUBRICATION.
APPLICATION FILED MAY 7, 1917.

1,238,239. Patented Aug. 28, 1917.

Inventor
Milton F. Williams

UNITED STATES PATENT OFFICE.

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

BEARING LUBRICATION.

1,238,239.   Specification of Letters Patent.   Patented Aug. 28, 1917.

Application filed May 7, 1917.   Serial No. 167,020.

*To all whom it may concern:*

Be it known that I, MILTON FRANKLIN WILLIAMS, a citizen of the United States, residing at the city of St. Louis, State of Missouri, have invented a certain new and useful Improvement in Bearing Lubrication, of which the following is a full, clear, and exact description, such as will enable others skilled in the art to which it appertains to make and use the same, reference being had to the accompanying drawings, forming part of this specification.

This invention relates to lubrication, and specifically to an arrangement for the lubrication of roller or ball bearings in heavy service.

The object of the invention is to provide a means for lubricating ball bearings which will insure a uniform and proper supply of lubricant thereto at all times during operation of the device, and which will also produce a cooling of the lubricant and the consequent cooling of the bearing.

Other and further objects will be obvious or pointed out hereinafter, reference being had to the accompanying drawings, in which—

Figure 1:
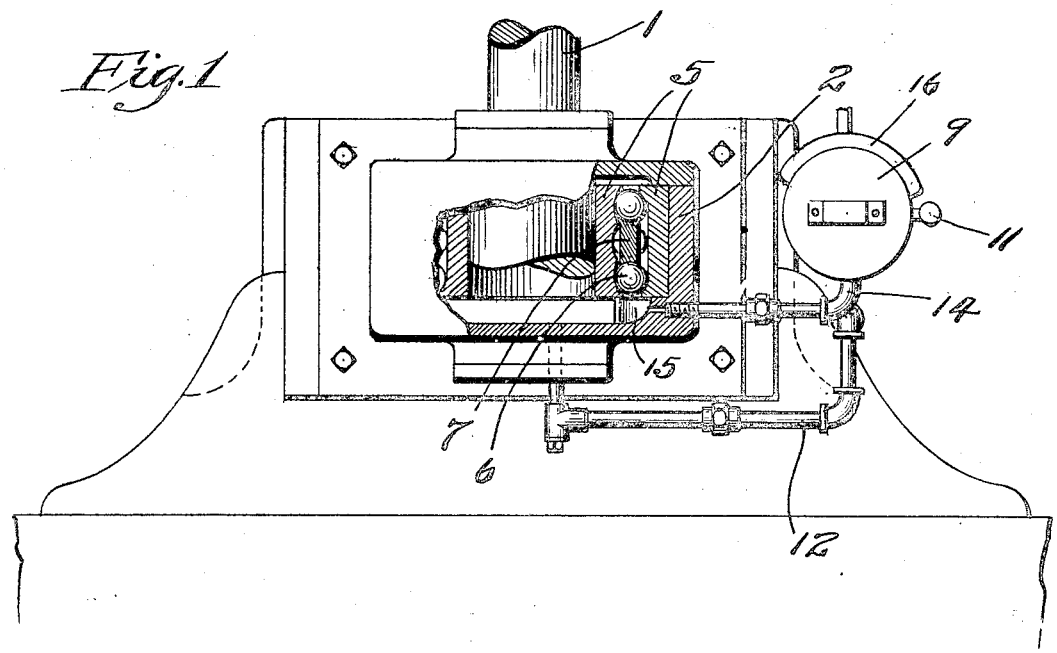
Figure 2:
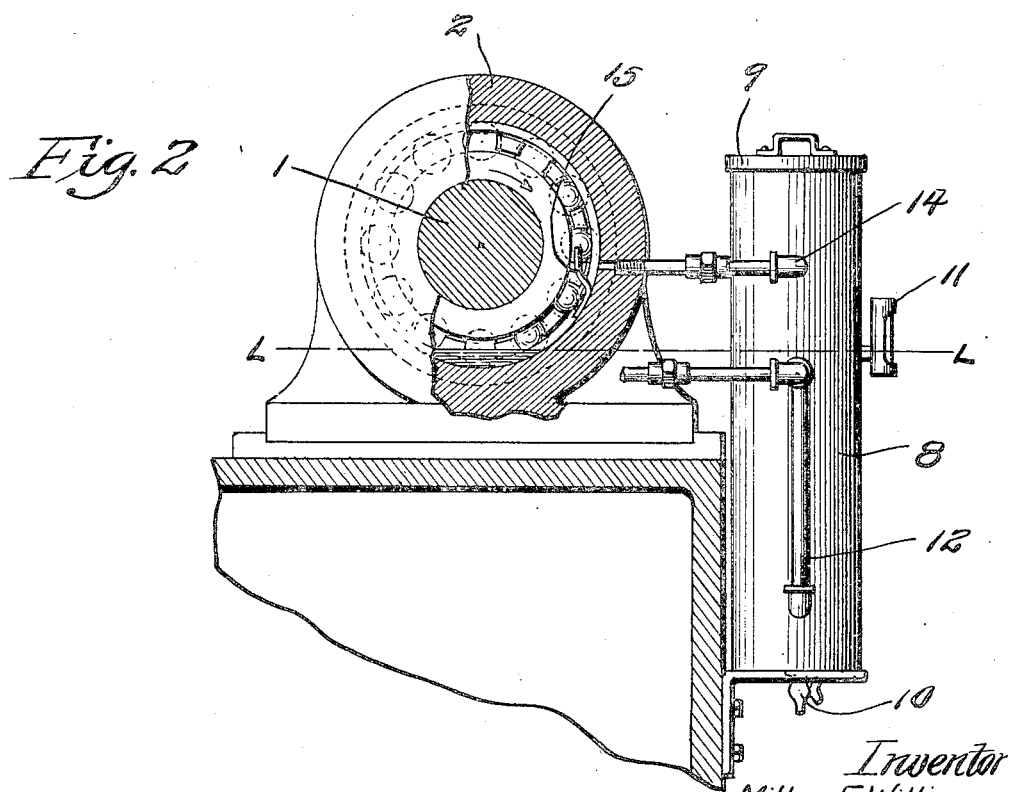

Figure 1 is a top view of a ball bearing including my improved lubricating arrangement, certain portions being broken away to show parts in section; and Fig. 2 is an elevation of the same, partly in section.

Referring to the illustrations by the reference characters applied, let it be understood that 1 represents the supported shaft and 2 represents the casing of the bearing; 5 indicates the ball races, 6 the balls and 7 the ball cage. These parts are all well known in the art, and are employed in the conventional fashion to form a rolling support for the shaft upon the casing. The casing completely incloses all portions of the bearing, and suitable packing is provided around the shaft so that lubricant may be retained within the casing.

At a convenient place adjacent the bearing is provided a lubricant container 8 in the form of a can having considerable vertical height. It is provided with a suitable filling closure 9, drain cock 10 and sight gage 11. At a point in its lower portion it is tapped by a supply pipe 12, and at a point in its upper portion by a return pipe 14. The supply pipe 12 leads to a point in the lower portion of the casing 2, where it is tapped through the casing for communication with the interior thereof at one side of the ball race. At a point above the point of entry of the supply pipe, the casing is tapped for communication with the return pipe 14. At one side of the ball race and in front of the point of communication of pipe 14, is disposed a member 15 which forms a trough with which the outlet opening has communication.

In operation the container 8 is filled with fluid lubricant to the level indicated by the line L. This level is approximately at the horizontal median line of the ball at the lowest point in the bearing. Upon operation of the shaft, the balls are carried around on the race in the usual fashion, in which operation they act to carry with them a portion of the lubricant which they pick up in the lower part of the casing. This gives the bearing the proper lubrication. The centrifugal action throws the lubricant against the outer race, and the movement of the balls thereon moves it laterally, so that a portion of it is thrown into the trough 15. Thence it flows through the outlet opening, through pipe 14 and back into the container 8. As the oil so flowing into the container 8 is warm, due to the movement of the bearing, it will tend to remain at the top of the container. However, as oil is being withdrawn from the bottom of the container to replace that so fed from the bearing back into the container, there is a constant movement of oil from the upper portion to the lower portion of the container, during which movement the oil is allowed to cool, so that, when it flows from the lower portion of the container back into the bearing, it is sufficiently cool to have a material effect in keeping the bearing cool. If desired, a suitable strainer may be disposed in the container between pipes 14 and 12 to extract any extraneous matter. The connection of the supply pipe 12 with the lubricant container is some little distance above the bottom thereof, so that a space is left below the supply pipe for the settling of any sediment which may remain in the lubricant, this sediment thereby being removed out of the circulation. Any suitable cooling or radiating device may be arranged in association with the lubricant container 8 to facilitate the exchange of heat from the lubricant therein. For the purpose of illustration, I have shown a water jacket 16 conductively associated with the container, and adapted for the reception or circulation of cool water. Numerous variations of this feature will suggest themselves.

I am aware that the device is susceptible of various modifications without departing from the scope of the invention indicated in the accompanying claims.

What I claim is:

1. A lubricating bearing comprising the combination of a casing, bearing members supported therein for revolution in a vertical orbit, a lubricant container of greater vertical height than the casing, a supply pipe leading from the lower portion of said container to the lower portion of the casing for the conduction of fluid lubricant from the container to the casing into contact with the bearing members, a return pipe communicating with the container and with the casing at a point adjacent the orbit of the bearing members above the point of communication of the supply pipe, there being means for guiding lubricant from the bearing member into the return pipe.

2. A lubricating bearing including a bearing member revoluble in a vertical orbit for supporting a rotating member, a casing inclosing said bearing member, a container for fluid lubricant, a supply pipe for conducting fluid lubricant from said container into the lower portion of the casing in the path of the bearing member, and a return pipe communicating with the container and with the casing adjacent the path of the bearing member in position to receive lubricant therefrom upon rotation of the supported member.

3. A lubricating bearing including revoluble members for supporting a shaft, races on which said members are held, a casing inclosing said races and members, a container for fluid lubricant, a pipe for conducting lubricant from said container to the lower portion of said casing, and a return pipe having a communication with said casing adjacent the path of the revoluble members and with the container above its point of communication with the supply pipe.

In testimony whereof I hereunto affix my signature this 30th day of April, 1917.

MILTON F. WILLIAMS.